(12) United States Patent
Stewart et al.

(10) Patent No.: US 7,353,502 B2
(45) Date of Patent: Apr. 1, 2008

(54) SYSTEM AND METHOD FOR CREATION OF SOFTWARE COMPONENTS

(75) Inventors: James T. Stewart, Newton, MA (US); Eugene F. McGoldrick, Newton, MA (US); John T. Micco, Waltham, MA (US)

(73) Assignee: The MathWorks, Inc., Natick, MA (US)

( * ) Notice: Subject to any disclaimer, the term of this patent is extended or adjusted under 35 U.S.C. 154(b) by 548 days.

(21) Appl. No.: 10/190,288

(22) Filed: Jul. 3, 2002

(65) Prior Publication Data

US 2004/0006762 A1 Jan. 8, 2004

(51) Int. Cl.
*G06F 9/45* (2006.01)
(52) U.S. Cl. .................................................. 717/136
(58) Field of Classification Search ................. 717/136
See application file for complete search history.

(56) References Cited

U.S. PATENT DOCUMENTS 6,865,499 B2 * 3/2005 Yutkowitz .................. 702/105

OTHER PUBLICATIONS

"Calling hell from heaven and heaven from hell", S. Finne, D. Leijen and E. Meijer, Proceedings of the fourth ACM SIGPLAN international conference on Functional programming, Paris, France, pp. 114-125, 1999 , ISBN:1-58113-111-9.*

"The Component Object Model: A technical Overview", by Sara Williams and Charlie Kindel, Microsoft Corporation, Oct. 1994.*

"From Typelib to Visual J++ 6.0 COM Object", Paul Johns, Microsoft Developer Network, Aug. 1998.*

Sigbjorn Finne, Daan Leijen, Erik Meijer, Simon Peyton Jones, "H/Direct: a binary foreign language interface for Haskell", Sep. 1998, ACM SIGPLAN Notices , Proceedings of the third ACM SIGPLAN international conference on Functional programming ICFP '98, vol. 34 Issue 1, p. 153-162.*

* cited by examiner

*Primary Examiner*—Wei Zhen
*Assistant Examiner*—Philip Wang
(74) *Attorney, Agent, or Firm*—Lahive & Cockfield, LLP

(57) ABSTRACT

A tool for automatically generating Component Object Model (COM) components for use in COM-compliant application from functions developed in a MATLAB programming environment. The tool receives as an input a component name and a selection of source code files which define functions. The tool processes the source code files to produce as an output a component having the selected component name. The component provides a binary interface through which application programs perform run-time function calls on the functions.

24 Claims, 14 Drawing Sheets

| | Sample: myprimes | | | | |
|---|---|---|---|---|---|
| 34 | | | | | |
| 35 | | | | | |
| 36 | | | | | |
| 37 | The below example runs the macro "myprimes" which | | | | |
| 38 | has an initial range for 4 prime numbers but will resize if | | | | |
| 39 | the output is larger. Gradually increase the number in cell A42 and rerun the macro. | | | | |
| 40 | CAUTION: Resizing will over write any existing data in the target cells | | | | |
| 41 | | | | | |
| 42 | 10 | | | | |

| | Sample: myprimes | | | | |
|---|---|---|---|---|---|
| 34 | | | | | |
| 35 | | | | | |
| 36 | | | | | |
| 37 | The below example runs the macro "myprimes" which | | | | |
| 38 | has an initial range for 4 prime numbers but will resize if | | | | |
| 39 | the output is larger. Gradually increase the number in cell A42 and rerun the macro. | | | | |
| 40 | CAUTION: Resizing will over write any existing data in the target cells | | | | |
| 41 | | | | | |
| 42 | 10 | 2 | 3 | 6 | 7 |
| 43 | | | | | |

```
Function foo(Optional X1 As Variant, _
             Optional X2 As Variant, _
                .
                .
                Optional varargin1 As Variant, _
                Optional varargin2 As Variant, _
                .
                .
                Optional vararginN As Variant) _
                As Variant
    Dim Y1, Y2, ..., varargout As Variant
    Dim varargin As Variant
       .
    (other declarations)
       .
    (function body)
       .
       .
    foo = Y1
       .
       .
    (error handling code)
       .
End Function
```

FIG. 7

SYSTEM AND METHOD FOR CREATION OF SOFTWARE COMPONENTS

BACKGROUND

The invention relates generally to tools for generating software components.

In recent years, many software developers have embraced an approach to software development that is component-based. A software component is a reusable piece of software in binary form that is intended to inter-operate with other software, such as an application program. In some cases, the software component is developed independently from the application program. Developers can provide greater flexibility with their application programs by structuring portions or features of the software as separate components.

Some components are written to support the well-known Component Object Model (COM), an object-based programming model developed by Microsoft® Corporation as a binary standard for object interoperability. Programs that support COM may be written in an object oriented programming language such as C++, JAVA programming language, and VISUAL BASIC programming language for example. COM enables software suppliers to package their functions into reusable software components for use by application developers. Thus, COM allows COM-compliant applications and components to cooperate with one another, even if written by different suppliers, in different languages, or while executing on different machines (with different operating systems).

COM components can be implemented in Dynamic Linked Library (DLL) files or executable files, and then linked to a portion of a COM-compliant application program. A COM component registers itself for use by the application program. A registry associated with the application program is used to store registration information for authorized components. The registry provides a way for a component to advise the application program about the component's functionality. For COM components, the registry typically includes information that identifies particular components, such as global unique identifiers (GUIDs) and class identifiers.

Access to a component, such as a COM object, for example, may be obtained through a class. The class provides an interface between the application program and the component. The GUID for a COM object is associated with a given class.

SUMMARY

In one aspect, the invention provides methods and apparatus, including computer program products, for automated generation of a software component for use by an application program. The methods include receiving source code for one or more functions created in a first programming environment and processing the source code to create a component including object code for the one or more functionsThe component is usable by the application program in a second programming environment to access the one or more functions of the component.

Embodiments of the invention may include one or more of the following features.

The component can be a Component Object Model (COM) component.

The first programming environment can be a MATLAB® programming environment.

The second programming environment can be a Microsoft® VISUAL BASIC -programming environment.

Particular implementations of the invention may provide one or more of the following advantages. The component generation mechanism enables a user to generate a COM component from a function such as a MATLAB function in a completely automated fashion. The user simply provides certain input information, including a selection of functions, and with one click of a user interface option generates a COM component for the selected functions. The component generated from one or more MATLAB functions can then be installed on and used by clients in a "stand-alone" manner, that is, without having to run MATLAB" on the client. The component is accessible by any language that, supports COM, such as VISUAL BASIC programing lanagage and C++.

Other features and advantages of the invention will be apparent from the following detailed description and from the claims.

DESCRIPTION OF DRAWINGS

FIGS. 2A-2H are various screens shots of a user interface of the builder tool shown in FIG. 1.

FIGS. 3A-3E are various user interface screen shots illustrating an example of using the tool to generate a COM component for selected functions and invoking those functions from within an Excel spreadsheet application.

FIG. 7 is an exemplary format of a function wrapper generated by the builder process.

Like reference numerals will be used to represent like elements.

DETAILED DESCRIPTION

Figure 1:
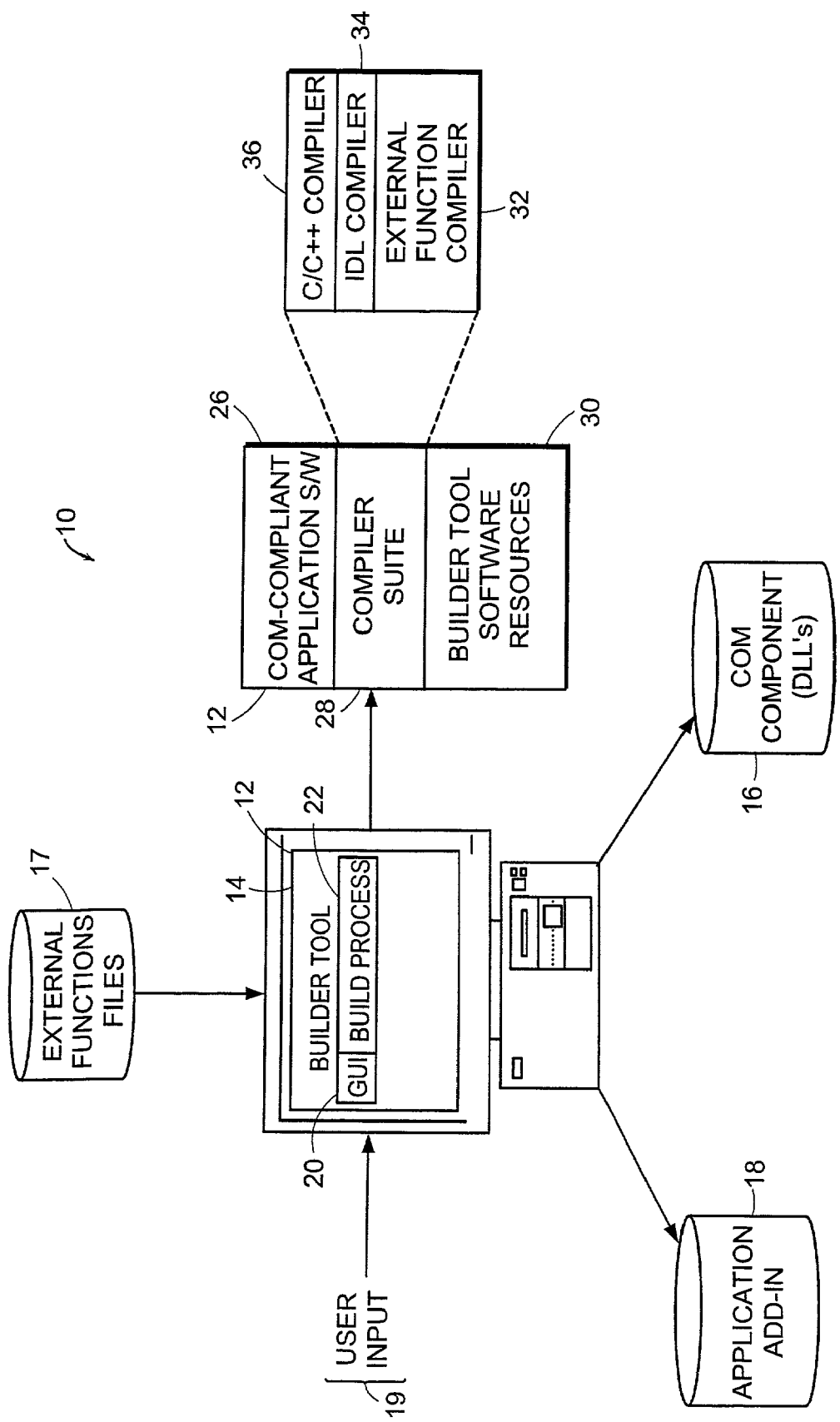
FIG. 1 is a block diagram of a development system configured to run a builder tool that provides a build process that automatically generates COM components and application add-in modules for use in a COM-compliant application from external functions.

Referring to FIG. 1, a development system 10 is configured with software 12 that includes a builder tool 14 (hereinafter, simply "tool 14"). The tool 14 can be used to generate Component Object Model (COM) components 16 from external functions (files) 17 stored on the system 10 and, optionally, to create application "add-in" files 18 as well, in response to user input 19. The tool 14 includes a graphical user interface (GUI) 20 and a build process 22, as will be described later. The software 12 further includes application software 26, a compiler suite 28 and other software resources 30 used by the tool 14. The application software 26 is "COM-compliant" software, that is, it supports COM, which is a widely accepted standard for integration of external functionality (like the functionality provided by the external functions 17) into applications, in particular, Microsoft® Office applications such as Excel. As will be explained more fully below, the tool 14, and more particularly, the build process 22, are used by the computer system user to construct the COM components 16 and application specific add-in files 18 from those functions of interest to the user. The functions are those that the user wishes to integrate with the application software 26. It will be appreciated that the software 12 includes other user interface and OS programs (not shown) for controlling system hardware, an example of which is described later with reference to FIG. 9.

The tool 14 enables a user to incorporate selected ones of the functions 17 into the COM-compliant application software 26. For illustrative purposes, the application software 26 will be described as Microsoft® Excel using Visual Basic for Applications (VBA), but could be other COM-compliant application software. In one embodiment, the external functions 17 are "M-functions", that is, mathematical and/or graphical functions coded using the programming language of MATLAB® software, a commercial software product available from The Math Works, Inc. The compiler suite 28 includes an external functions compiler 32 for compiling the external functions 17, an Interface Description Language (IDL) compiler 34 and a C/C++ compiler 36. It will be understood that the types of compilers used by the tool 14 will be dependent on the types of application software and external functions that are involved in the processing of tool 14. To compile M-files, the tool 14 requires that the compiler 32 be a MATLAB compiler, also available from The Math Works, Inc. The software resources 30 include the above-mentioned MATLAB product, and can further include various MATLAB libraries.

Each component 16 generated by the build process 22 is a standalone COM object. The COM component exposes a class to the VBA application programming environment. The class contains a set of functions called methods, which correspond to the original M-functions included in the component. The application add-in file 18 provides a mapping between the call syntax of MATLAB environment, where the M-functions are created, and VISUAL BASIC environment, where the M-functions are ultimately called. Together the add-in file and COM component allow functionality designed in MATLAB environment to be accessed from the application environment of the application software 26.

The GUI 20 enables the user to interact with the tool 14, that is, use the tool 14 to create and modify "projects", which bring together all of the elements necessary to build a COM component that can be accessed from Excel through VBA, and execute the build process 22 to build the COM component for a given project.

When creating a component, the user specifies a class name and component name representing the name of a DLL (or, alternatively, an executable) to be created for the component. The class name denotes the name of the class that will ultimately be used by the application software at runtime to perform a call on a specific method. The relationship between component name and class name, and which methods (M-functions) go with a particular class is purely organizational. Preferably, the name of each class is descriptive of what the class does, and related functions are grouped together into classes. Such organization has the advantage of reducing the amount of code that has to be rebuilt and redeployed when one function is changed.

Figure 2A:
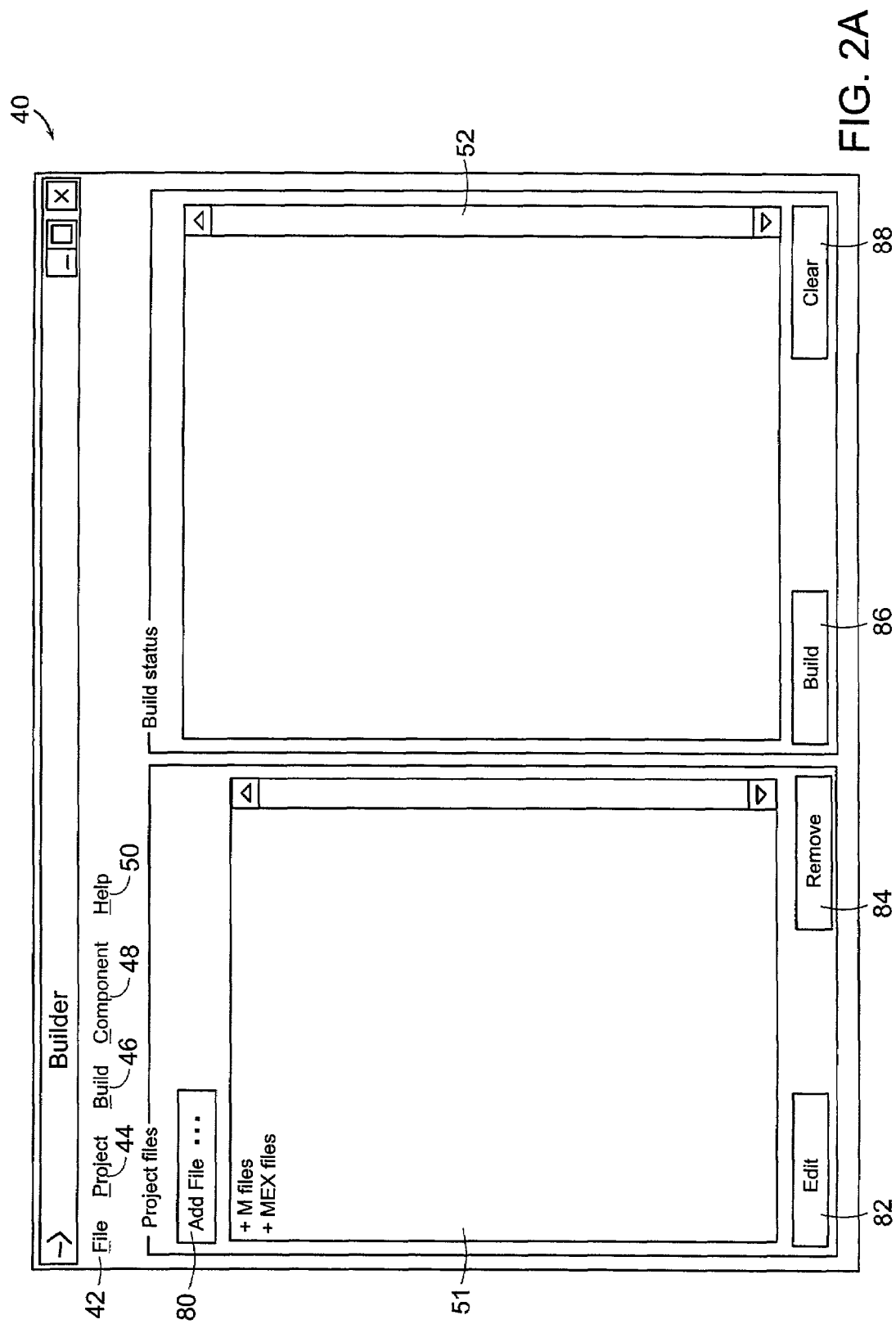

FIGS. 2A-2H show various screen shots of the GUI 20, and will be used to illustrate the operation of the tool from a user's perspective. To begin a project creation, for example, in a MATLAB environment, the user enters a MATLAB command 'mxltool' at the command line. Referring to FIG. 2A, in response to the 'mxltool' command, the user is presented with a main window 40. The GUI main window 40 provides the following menus: "File" 42; "Project" 44, "Build" 46; "Component" 48; and "Help" 50. The window 40 includes a Project files frame 51 and a Build status frame (or pane) 52 as well.

Figure 2B:
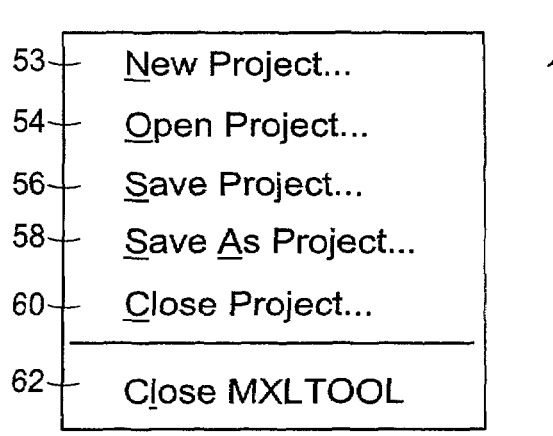

The "File" menu 42 creates and manages the projects of the tool 14. Referring to FIG. 2B, the "File" menu 42 includes the following menu items: "New Project" 53; "Open Project" 54; "Save Project" 56; "Save As Project" 58; "Close Project" 60 and "Close MXLTOOL" 62. The "New Project" menu item 53 opens a Project Settings dialog 70, as shown in FIG. 2F. It creates a project workspace where the user can add M-files (files corresponding to M-functions) to the project and store project settings. The "Open Project" menu item 54 allows the user to load a previously saved project. The "Save Project" menu item 56 saves the current project. If the user has not yet saved the current project, the user is prompted for a file name. The "Save As Project" menu item 58 saves the current project after prompting the user for a file name. The "Close Project" menu item 60 closes the current project. The "Close MXLTOOL" menu item 62 closes the GUI 20.

Figure 2C:
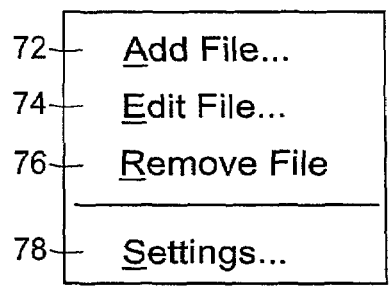

Referring to FIG. 2A and FIG. 2C, the Project Menu 44 controls the management of the current project's files. It includes the menu items "Add File" 72, "Edit File" 74, "Remove File" 76 and "Settings" 78. The "Add File" menu item 72 adds an M-file to the current project. An "Add file" button 80 in the main Window 40 performs the same task. The "Edit File" menu item 74 allows the user to edit a selected M-file. An "Edit" button 82 in the Project files frame 51 of the main Window 40 performs the same task. The "Remove File" menu item 76 allows the user to remove the currently selected files from the project. A "Remove" button 84 in the Project files frame 51 performs the same task. The "Settings" menu item 78 opens a project settings dialog 90 showing the current project's information, as shown in FIG. 2G.

Figure 2D:
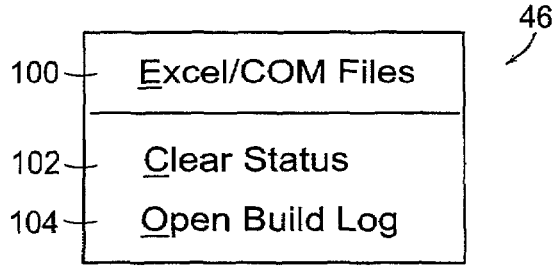

Referring to FIGS. 2A and 2D, the Build Menu 46 controls the building of the project's files into a COM component accessible in Excel. It includes three menu items: an "Excel/COM files" menu item 100, a "Clear Status" menu item 102 and an "Open Build Log" menu item 104. The Excel/COM files menu item 100 causes the execution of the build process 22, which builds the project files into a COM component and generates VBA code necessary to create an Excel add-in that allows the COM component to be accessed from within Excel/VBA environment. The build process 22 will be described in further detail later with reference to FIGS. 4 and 5. The Clear Status menu item 102 clears the Build status window 51 in the main window 40. The Open Build Log menu item 104 displays project status that has been saved in a log file.

Figure 2E:
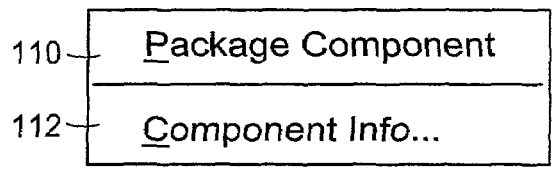
Figures 2F, 2G:
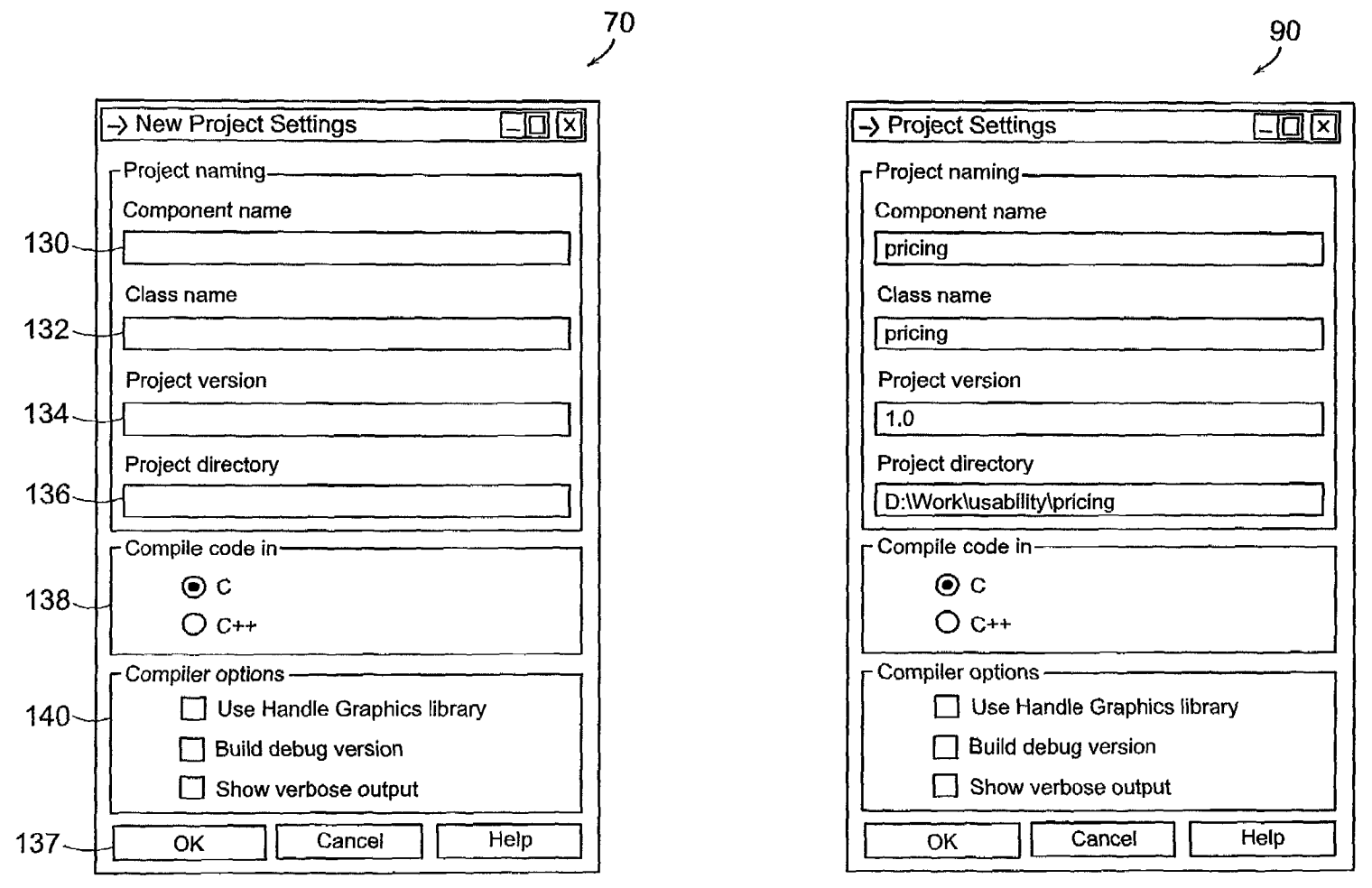
Figure 2H:
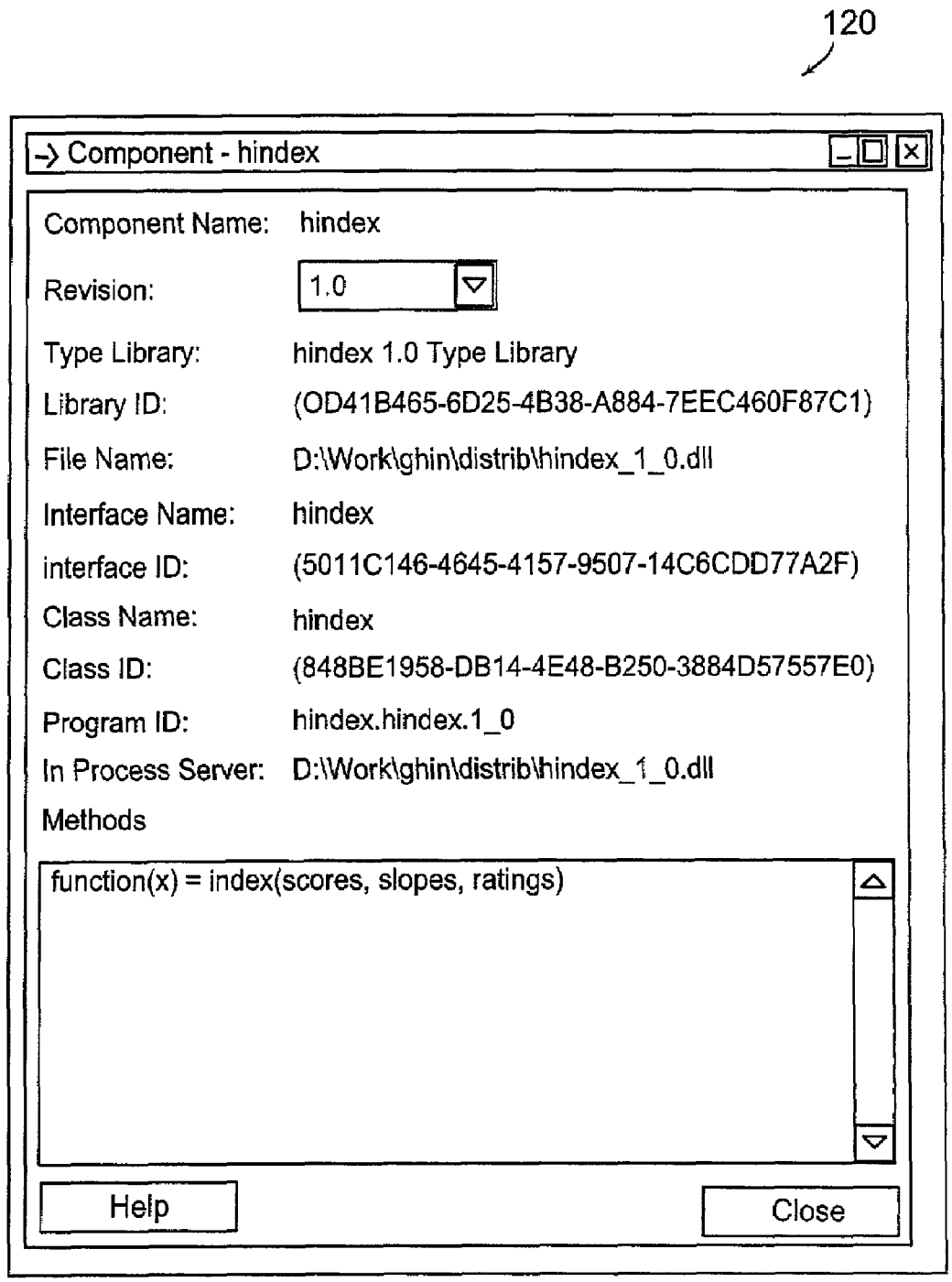

Referring to FIGS. 2A and 2E, the Component Menu 48 includes a "Package Component" menu item 110 and a "Component Info" menu item 112. The Package Component menu item 110 is used to ready the files for deployment in an end-user system. It packages the files produced by the build process 22 in a self-extracting executable file. The "Component Info" menu item 112 displays a Component dialog 120, shown in FIG. 2H, which contains information about the current project's component and component versions. This dialog presents the component information that will be stored in a registry on the end-user system, as is later described with reference to FIG. 8.

The Help Menu 50 provides the user with access to help for the tool 14.

Referring again to FIGS. 2A, 2B and 2F, the user selects New Project 53 from the File menu 42 of window 40 to view the New Project Settings dialog 70. The New Project Settings dialog 70 includes various information fields, including component name 130, class name 132, project version 134 and project directory 136. The component name 130 denotes the name of the DLL created by the build process 22. After the user enters the component name, the GUI 20 automatically enters a class name identical to the component name in the class name field 132 as a default; however, the user can change the class name to one more descriptive of the class purpose. The project version 134 and directory 136 are automatically generated by the GUI 20. The project directory 136 specifies where any project and build files are written when compiling and packaging the component generated by the build process. It is automatically generated from the name of the current directory and the component name. The user can accept the automatically generated project directory path or choose different one. The dialog 70 includes an OK button 137, which when "clicked on" by the user, causes the path to be saved.

The dialog 70 includes a "Compile code in" option 138 that enables the user to select a compiler language. In the example shown, the user can select to compile code in either C or C++. The user can select from one of several compiler options 140, as shown. Once the user accepts the new project settings by clicking on the OK button 137, those settings become part of the user's project workspace and are saved to the project file along with the names of any M-files the user subsequently adds to the project. A project file of the name <component_name>.mxl is automatically saved to the project directory.

After the user creates a project, the user enables the Project, Build and Component menu options 44, 46 and 48, respectively, on the main window 40. Referring to FIGS. 2A and 2C, the user adds one or more M-files to the project by clicking on the "Add File" button 80 or selecting the Add File menu choice 72 from the Project menu 44. The Remove button or Project>Remove File menu choice allows the user to remove any selected M-files. Selecting the Edit button 82, or the Edit File menu item 74, or double clicking on an M-file name in the Project files frame 51 opens the selected M-file in the MATLAB editor for modification or debugging.

After the user had defined the project settings and added any desired M-functions to the project, the user can build a standalone COM component (in a DLL) and the necessary Visual Basic application code that allows the DLL to be accessed from Excel. Referring to FIGS. 2A and 2D, this task is accomplished by choosing EXCEL/COM files 100 (from the Build menu 46) or clicking on the Build button 86. Either option causes execution of the build process 22, which writes source files to a <project_dir>\src directory and the generated output files to a <project_dir>\distrib directory.

Still referring to FIGS. 2A and 2D, the Build status panel 52 shows the output of the build process and informs the user of any problems encountered during the process. The files appearing in the <project_dir>\distrib directory will be the generated DLL and VBA file (.bas file). The Build Status panel 52 may be cleared by selecting the Clear Status menu item 102 from the Build menu 46, or clicking on the Clear button 88. The output of the build process is saved in a log file <project_dir>\build.log. To open the log, the user chooses the Open Build Log menu item 104 from the Build menu 46. The Open Build Log 104 provides a record of the build process that the user can refer to after having cleared the Build Status panel 52.

The VBA (.bas) file created during the build process contains the necessary initialization code and VBA formula function for each function processed by the build process. Each supplied formula function essentially wraps a call to the respective compiled M-function in a format that can be accessed from within an Excel worksheet. The formula function takes a list of inputs corresponding to the inputs of the original M-function and returns a single output corresponding to the first output argument. Formula functions of this type are most useful to access a function of one or more inputs that returns a single scalar value. When the user requires multiple outputs or outputs representing ranges of data, a more general VISUAL BASIC subroutine can be used.

The user creates an application add-in file, for example, for an Excel application, a ".xla" file, from the VBA .bas file. In the Excel worksheet window, the user saves the .bas file as a .xla file to the <project_dir>\distrib. The procedure for creating an Excel add-in from the generated VBA code (that is, the bas .file) is as follows:

1. Start Excel
2. Choose Tools>Macros>Visual Basic Editor
3. In the Visual Basic Editor Window, choose File>Import
4. Select VBA file (.bas) from the <project_dir>\distrib directory
5. Close the Visual Basic Editor
6. In the Excel worksheet window, choose File>Save As . . .
7. Set the Save As type to Microsoft Excel add-in (*.xla)
8. Save the .xla file to <project_dir>\distrib Once the user has successfully created the COM component and the application add-in, the user is ready to package the component for distribution to end-users. Referring to FIGS. 2A and 2E, the user chooses the Package Component menu item 10 from the Component menu 48 to create a self-extracting executable. The self-extracting executable is given the name <componentname>.exe.

Each component is accessed from Microsoft Exel through Visual Basic for Applications (VBA). Thus, the user or end-user needs to integrate the component into a VBA project by creating a simple code module with functions and/or subroutines that load the necessary components, call methods (as needed), and process any errors.

VBA provides two basic procedure types, functions and subroutines. The user accesses a VBA function directly from a cell in a worksheet as a formula function and accesses a subroutine as a general function. The function procedures are useful when the original function (M-file) takes one or more inputs and returns one scalar output. When the original function returns an array of values or multiple outputs, the user uses a subroutine procedure to map the outputs into multiple cells/ranges in the worksheet. As discussed earlier, when a component is created, a VBA module (.bas file) containing simple call wrappers (each implemented as a function procedure for each method of the class) is also produced.

Before an end user uses a generated COM component, the end user needs to initialize any supporting libraries with the current instance of Excel. The supporting libraries are those libraries which are linked to the COM component object files, as will be described with reference to FIG. 5. This initialization must done for an Excel session that uses the components. To perform the initialization, the end user invokes a call to a utility library function MWInitApplication, a member of MMUtil class. This class is part of the MWComUtil library.

The user or end-user could write a subroutine that performs the initialization once, and simply exits for all subsequent calls.

The builder process 22 automatically converts all global variables shared by the M-files that make up a class to properties on that class. Class properties allow an object to retain an internal state between method calls. Global variables are variables that are declared with the global keyword. Properties are particularly useful in dealing with a large array that does not change often, but needs to be operated on frequently. The array can be set once as a class property and operated on repeatedly without incurring the overhead of passing (and converting) the data into each method every time it is called.

The builder process 22 also supports events (or "callbacks") through a simple MATLAB language pragma. The user provides a MATLAB functions stub that serves as the prototype for the event, and provides an implementation of the function in the client code. The net effect is that when any other MATLAB function calls the event function, the call is dispatched to the "event handler" in the client application code. A MATLAB function can be turned into an event function by placing a '%#event' pragma into the MATLAB code. MATLAB compiler interprets this statement as a comment. When that same function is included as a method on a COM object, the build process 22 generates an "outgoing interface" for the method, which identifies the method as an event. The outgoing interface is then implemented by the client application code. One simple use of a callback might be to give a client application periodic feedback during a long-running calculation, e.g., for a task that requires "n" iterations, signal an event to increment a progress bar in the user interface on each iteration.

Before calling a class method (compiled M-function), the user creates an instance of the class that contains the method. To support this task, VBA provides two techniques: "Create Object" and "New Operator". The Create Object method uses the VBA API CreateObject to create an instance of the class. The New Operator method uses the VBA New Operator on a variable explicitly dimensioned as the class to be created.

After a class instance has been created, the VBA add-in module can call the class methods to access the compiled M-functions. A mapping is provided from the original function syntax to the method's argument list.

The first argument of a class method is always nargout, which is of type Long. This input parameter passes the normal MATLAB nargout parameter to the compiled function and specifies how many outputs are requested. Following nargout are the output parameters listed in the same order as they appear on the left of the original MATLAB function. Next come the input parameters listed in the same order as they appear on the right side of the original MATLAB function. All input and output arguments are typed as Variant, the default VISUAL BASIC data type.

The following example illustrates the process of passing input and output parameters from VBA to the generated component's class methods.

The first example is a formula function that takes two inputs and returns one output. This function dispatches the call to a class method that corresponds to an M-function of the form function y=foo(x1,y1).

```
Function foo(x1 As Variant, x2 As Variant) As Variant
Dim aClass As Object
Dim y As Variant
On Error Goto Handle_Error
aClass=CreateObject("mycomponent.myclass.1.0")
Call aClass.foo(1,y,x1,x2)
foo=y
Exit Function
Handle_Error:
Foo=Err.Description
End Function
```

When varargin and/or varargout are present in the original M-function, these parameters are added to the argument list of the class method as the last input/output parameters in the list. Multiple arguments can be passed as a varargin array by creating a Variant array, assigning each element of the array to the respective input argument.

Each component exposes a single read/write property named MWFlags of type MWFlags. The MWFlags property is divided into two sets of constants: array formatting flags and data conversion flags. The data conversion flags change selected behavior of the data conversion process from Variants to MATLAB types and vice-versa. The components of tool 14 allow data conversion flags to be set at the class level and not on a per-argument basis. Array formatting flags guide the data conversion to produce either a MATLAB cell array or matrix from general Variant data on input or to produce an array of Variants or a single Variant containing an array of a basic type on output. Data conversion flags deal with type conversions of individual array elements. Two data conversion flags, CoerceNumericTo Type and InputDateFormat, govern how numeric and date types are converted from VBA to MATLAB programming language.

FIGS. 3A-3E provide examples illustrating the process of building COM objects from MATLAB M-files "myplot.m" and "myprimes.m", and invoking those functions from within Excel using a VBA macro "xlmulti.xls". The M-file "myplot.m" takes a single integer input and plots a line from 1 to that number. The M-file "myprimes.m" takes a single integer input n and returns all the prime numbers less than or equal to n.

From the MATLAB command prompt, the user enters the command 'mxltool' to start the Builder tool GUI 20. From the File menu 42, the user selects New Project 52. This opens the New Project Settings dialog 70. The user enters a component name, e.g., "xlmulti" into the component name field 130. Using the TAB key to move to the next field causes the class name field 132 to be filled in with the name "xlmulti".

Figures 3A, 3B:
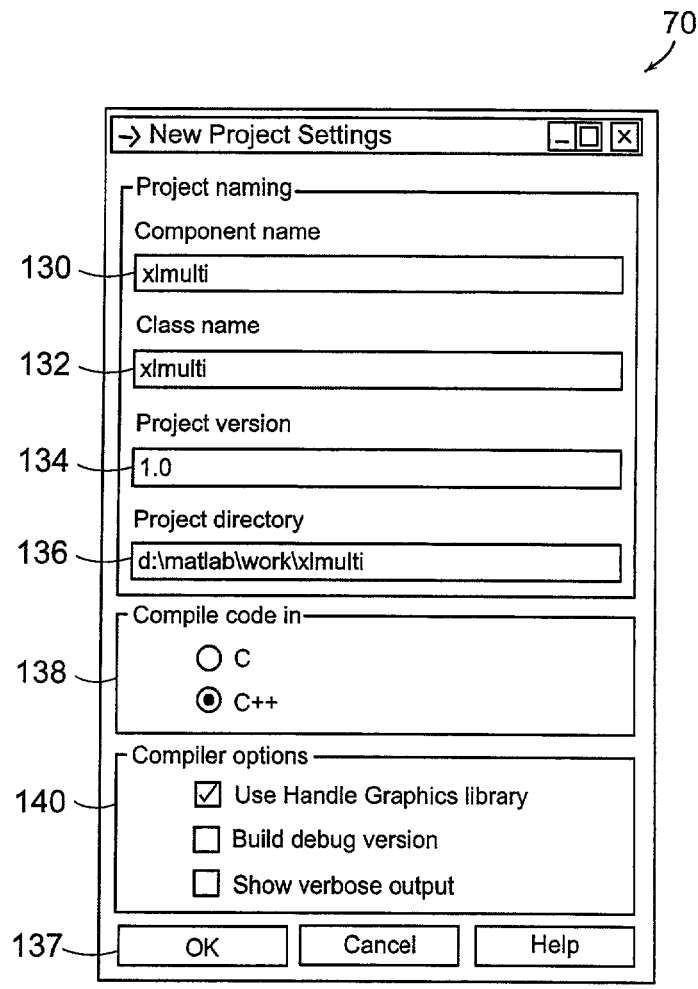

In the options section 138, the user selects C++ as the code in which the component is to be compiled. Under compiler options 140, the user checks "Use Handle Graphics Library". The completed New Projects Setting dialog 70 appears as illustrated in FIG. 3A. The user clicks on the OK button 137 to create the "xlmulti" project.

Next the user proceeds to click on Add File 44, selecting the file myplot.m from a directory <matlab>\work\xlmulti. The user repeats this step to add the files myprimes.m to the project. The user clicks on the "Build" button 86 or selects Excel/COM files 100 from the Build menu 46 to generate the COM component from the selected M-files.

Figure 3C:
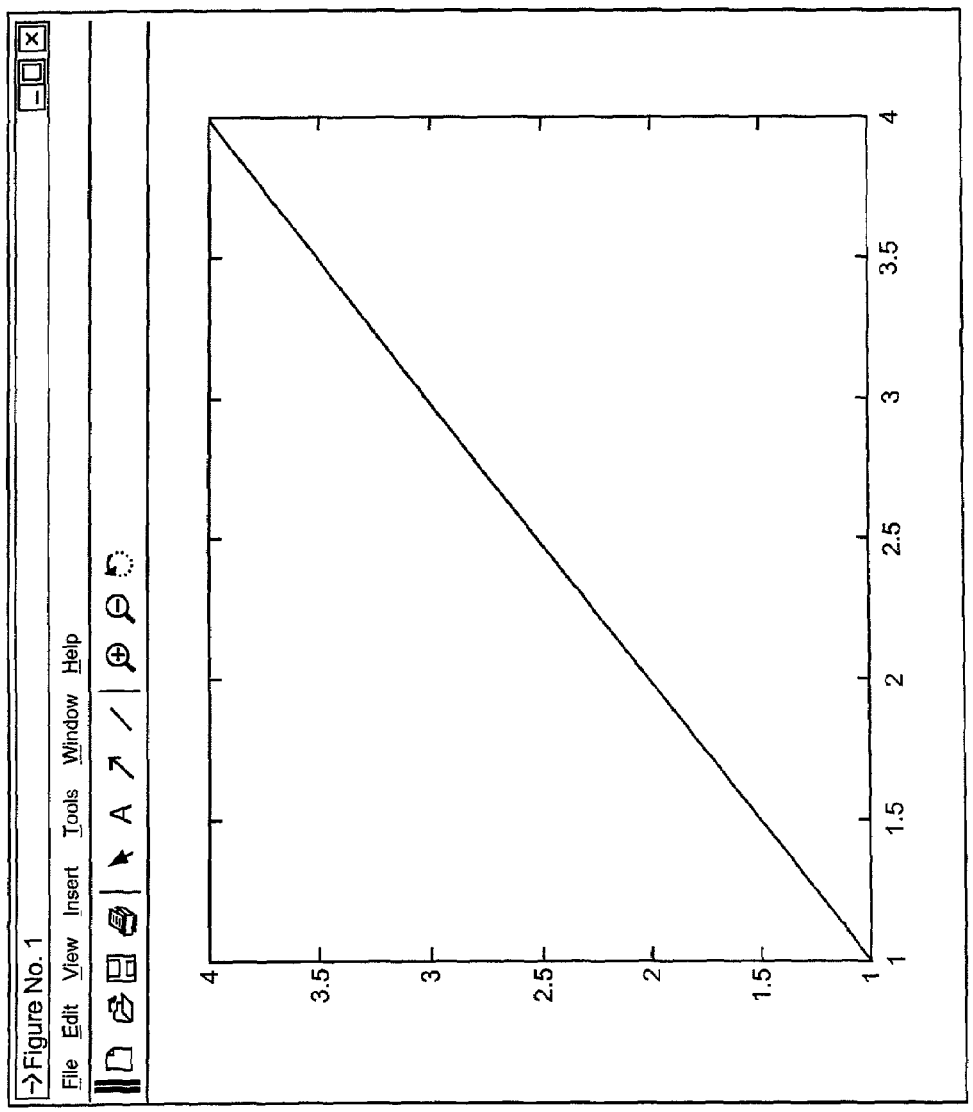

In the illustration of FIGS. 3B and 3C, the application calls the function myplot with a value of 4. FIG. 3B shows an Excel spreadsheet 142 (shown in partial view) in which cell A7, indicated by reference numeral 143, is made the active cell for the purpose of executing the myplot function. The calling cell 143 contains 0 because the function does not return a value. Referring to FIG. 3C, when the user presses the "F2" key followed by the "enter" key, the application plots a line from 1 to 4 in a MATLAB figure window 144. Thus, the graphic can be manipulated as if it were called from MATLAB directly. Thus, FIG. 3C shows the resulting plot with a value of 4.

FIGS. 3D-3F illustrate the myprime example. The application calls the function myprimes.m with an initial value of 10. FIG. 3D shows an Excel spreadsheet 146 (partial view) in which the initial value of 10 is stored in cell A42, as indicated by reference number 147. As shown in FIG. 3E, the function returns all the prime numbers less than 10 to cells B42 through E42, indicated by reference numeral 149.

Thus, the tool 14 enables a user to pass Microsoft Excel worksheet values to MATLAB functions via Visual Basic for Applications and to return a function's output to a cell or range of cells in the worksheet.

Figure 4:
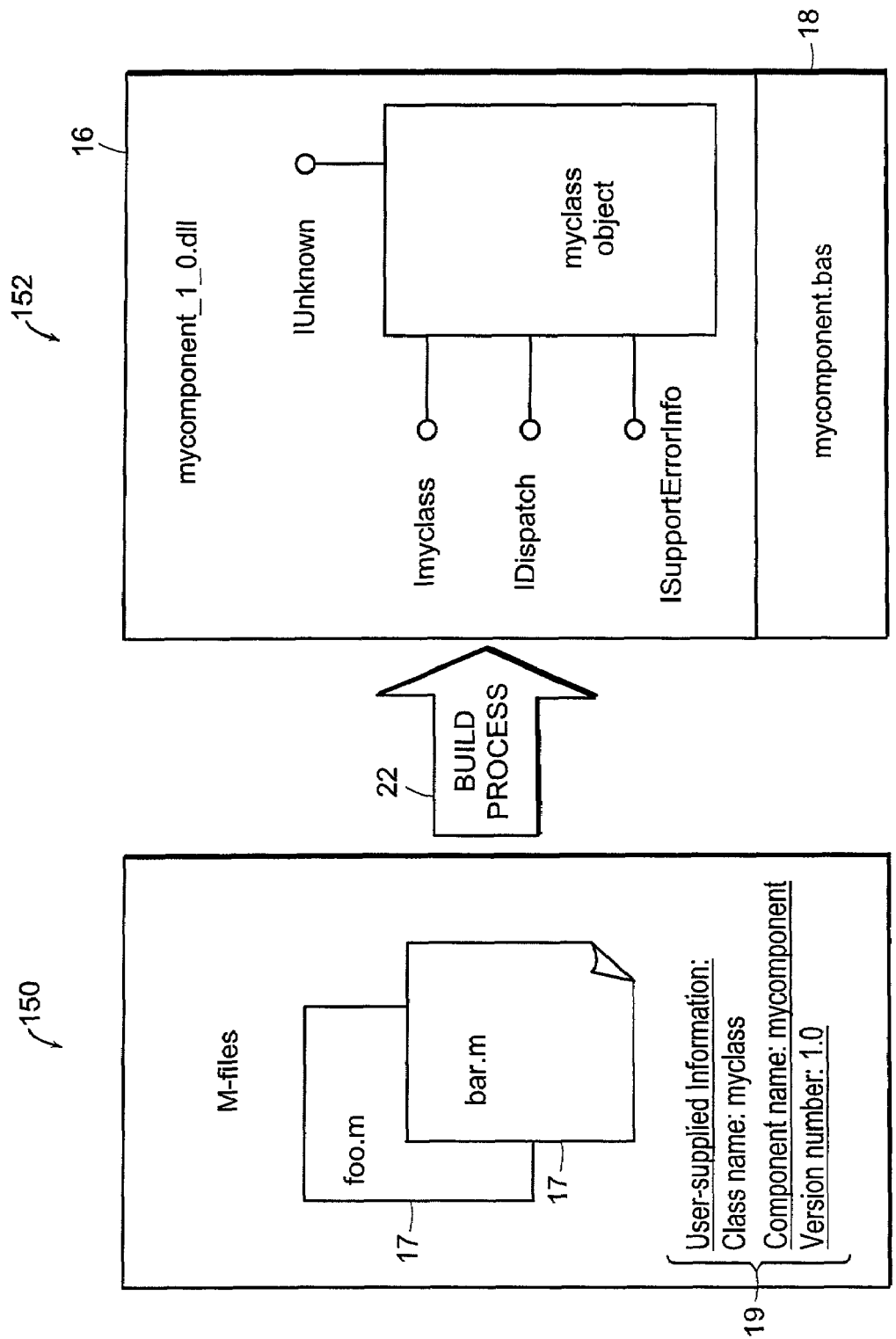
FIG. 4 is a diagram depicting the inputs and outputs of the build process shown in FIG. 1.
Figure 5:
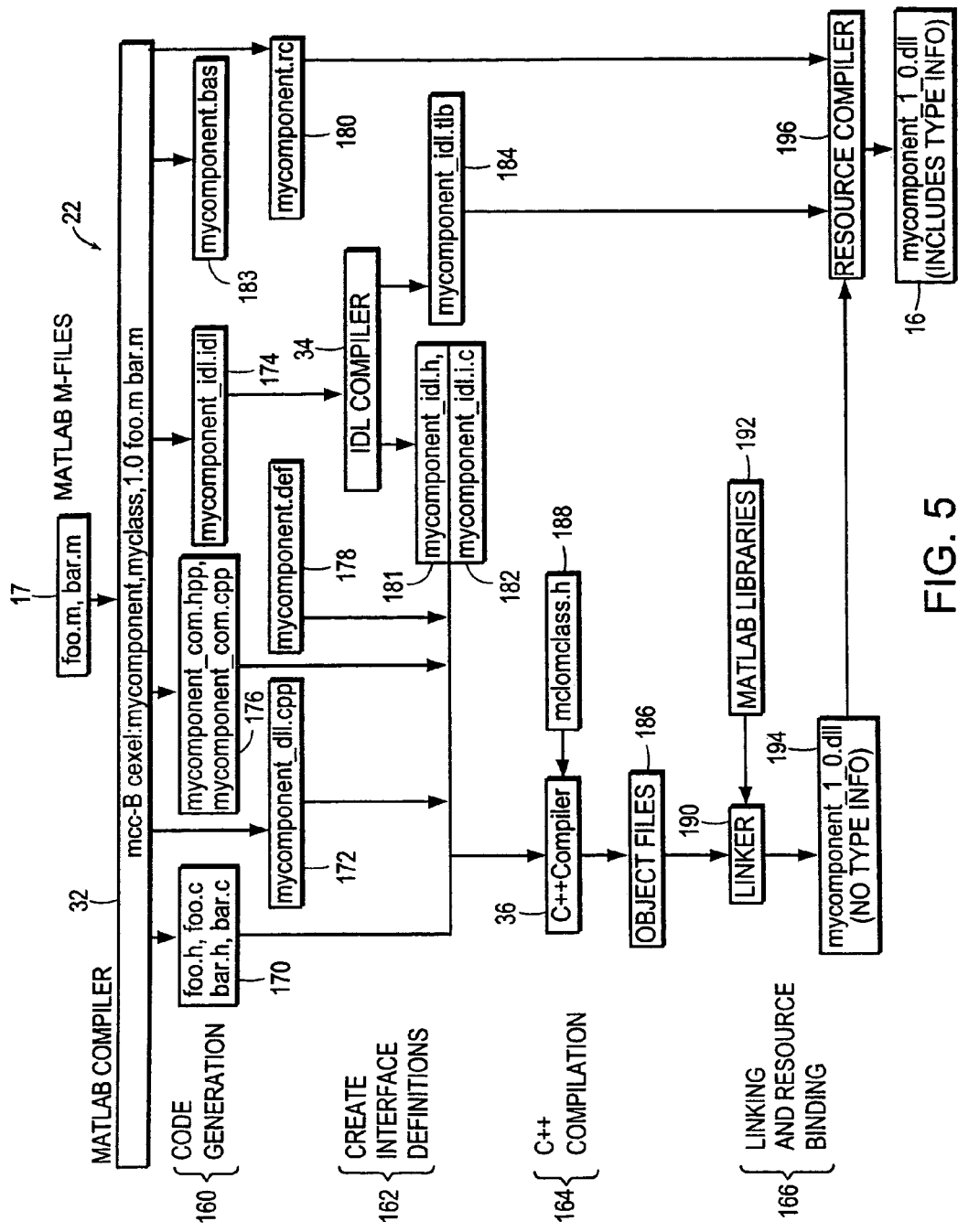
FIG. 5 is a flow diagram of the build process shown in FIGS. 1 and 4.

FIGS. 4 and 5 illustrate the build process 22, using exemplary M-files "foo.m" and "bar.m" as selected M-files. FIG. 4 shows build process inputs 150, which are received by the build process 22 and processed to produce build process outputs 152. The build process inputs 150 include the user-selected M-files 17, and the user-supplied information including component name, class name and a version number. In the illustrated example, the class name is "myclass", the component name is "mycomponent" and the version number is 1.0. The outputs 152 include a COM object ("myclass") in the DLL ("mycomponent_1_0.dll") 16, and a .bas file ("mycomponent.bas") 18. The build process 22 uses the compiler suite 28 and other resources 30, as will be described with reference to FIG. 5, to produce the DLL and the bas file from the selected M-files. Thus, the process of building a COM component (from one or more M-files) and making that component accessible to a COM-compliant application environment like Excel is completely automatic when using the tool 14.

Referring to FIG. 5, details of the build process 22 are shown. The processing of the build process 22 may be viewed as occurring in four stages. In a first stage 160, the process 22 generates source code. In a second stage 162, the process 22 creates interface definitions. In a third stage 164, C compilation is performed. In the fourth stage 166, the process 22 performs linking and resource binding to produce a COM component (DLL). Although the build process 22 is described and illustrated as producing a COM component in DLL, it will be understood that the build process 22 could produce the COM component as an executable file instead, as noted earlier.

In the first stage 160, the process 22, using the MATLAB compiler 32, generates all source code and other supporting files need to create the component. First the process 22 produces .c and .h files 170 representing the C-language translation of the M-code in the original M-files (in the running example, "foo.m" and "bar.m") 17. Next, the process 22 creates a main source file ("mycomponent_dll.cpp") 172 containing an implementation of each exported function of the DLL. The process 22 produces an Interface Description Language (IDL) file ("mycomponent_idl.idl") 174. The IDL file 174 contains the specifications for the component's types library, interface, and class, with associated GUIDs. The process 22 creates a C++ class definition file ("mycomponent_com.hpp") and implementation file ("mycomponent_com.cpp"), collectively 176. Producing a COM class requires the generation of these files. The process automatically produces the necessary IDL and C/C++ code to build each COM class in the component. For additional details of IDL and C++ coding rules for building COM objects, reference may be had to Microsoft COM documentation.

In addition to the source files, the process 22 generates a DLL exports file ("mycomponent.def") 178 and a resource script ("mycomponent.rc") 180. It also creates a file containing VISUAL BASIC code ("mycomponent.bas") 183. The VISUAL BASIC code file 183 contains the VB call wrappers for each class method in the form of formula functions. The process 22 produces a VISUAL BASIC function wrapper for each method used to implement an Excel formula function. Formula functions are useful when calling a method that returns a single scalar value with one or more inputs.

Once the code generation stage is completed, the process 22 creates interface definitions in the second processing stage 162. To begin, the process 22 invokes the IDL compiler 34 to process the IDL file (that is, "mycomponent_idl.idl") 174 in order to create an interface header file ("mycomponent_idl.h") 181 and an interface GUID file ("mycomponent_idl_i.c") 182, and a component type library file ("mycomponent_idl.tlb") 184. The interface header file 181 contains type definitions and function declarations based on the interface definition in the IDL file 174. The interface GUID file 182 contains the definitions of the GUIDs from all interfaces in the IDL file 174. The component type library file 184 contains a binary representation of all types and objects exposed by the component.

During the third stage of processing 164, the process 22 uses the C/C++ Compiler 36 to compile all of source files generated during stages 1 and 2 into object code (files) 186. One additional file containing a set of C++ template classes ("mclcomclass.h") 188 is applied to the source files by the compiler 36. The file 188 contains template implementations of all necessary COM base classes, as well as error handling and registration code.

After object code has been generated, and referring now to the fourth stage of processing 166, the process 22 invokes a linker 190 to operate on the object files 186 and any required MATLAB libraries 192 to produce a DLL component ("mycomponent_1_0.dll"). For example, the process 22 can link the MathWorks MWComUtil library, which includes several functions used in array processing, as well as type definitions used in data conversion, to the object files 186. The MWComUtil library is contained in a DLL and must be registered once on each machine that uses the COM component generated by the process 22.

At this point, the process binds the type library 184 to the DLL 194 as a resource. The process accomplishes this binding by invoking a resource compiler 196 on the DLL 194, along with the resource script 180, to bind the type library file 184 into the completed DLL 16.

The DLL 16 is a self-registering component—that is, it contains all the necessary code to enable a full description of itself to be added to or removed from a COM component registry on the end-user system. The process automatically generates GUIDs for COM classes, interfaces, and type libraries that are defined within a component at build time, and codes these keys into the component's self-registration code.

Figure 6:
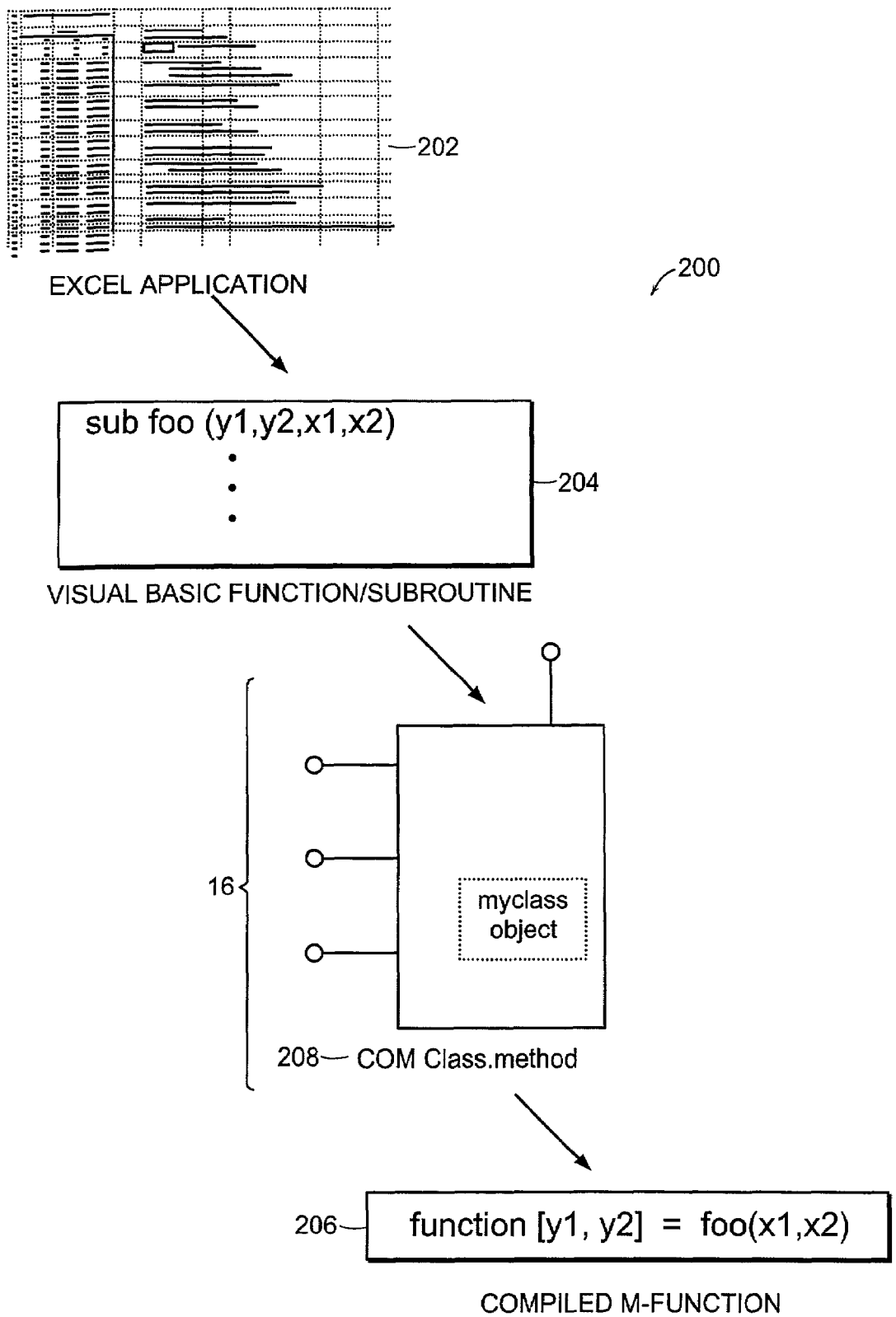
FIG. 6 is a diagram depicting how a function call originating from an Excel VISUAL BASIC application is routed from a function/subroutine into a compiled M-function via a generated COM object.

FIG. 6 shows an exemplary function call routing 200 using the DLL file and Visual Basis wrapper file generated by the build process 22 shown in FIG. 5. A function call originating from an Excel worksheet 202 is routed from a VISUAL BASIC function 204 (in the wrapper file) into a compiled M-function 206 via a COM class method 208 of the generated component (DLL) 16.

As discussed earlier, a VISUAL BASIC function wrapper is created for each method used to implement an Excel formula function. Formula functions are useful when calling a method that returns a single scalar value with one or more inputs. The most generic MATLAB function function [Y1, Y2, varargout]=foo(X1, X2, ..., varargin]

maps directly to the following IDL signature:

H RESULT foo ([in] long nargout,

[in, out] VARIANT*Y1,

[in, out] VARIANT*Y2,

⋮

[in, out] VARIANT* varagout,

[in] VARIANT X1,

[in] VARIANT X2

⋮

[in] VARIANT varargin);

This IDL function definition is generated by producing a function with the same name as the original M-function and an argument list containing all inputs and outputs of the original plus one additional parameter, nargout. The nargout parameter is an [in] parameter of type long, and is always the first argument in the list. It allows correct passage of the MATLAB nargout parameter to the compiled M-code. Following the nargout parameter, the outputs are listed in the order they appear on the left side of the MATLAB function, and are tagged as [in, out], meaning that they are passed in both directions. The function inputs are listed next, appearing in the same order as they do in the right side of the original equation. All inputs are tagged as [in] parameters. When present, the optional varargin/varargout parameters are always listed as the last input parameters and the last output parameters. All parameters other than nargout are passed as COM VARIANT types.

The Visual Basic mapping to the IDL signature shown above is

Sub foo (nargout As Long, _

Y1 As Variant, _

Y2 As Variant, _

⋮ varargout As Variant, _

X1 As Variant, _

X2 As Variant, _

⋮ varargin As Variant)

Microsoft COM documentation describes mappings to other languages, such as C++.

VISUAL BASIC environment provides native support for COM VARIANTS with the Variant type, as well as implicit conversions for all VB basic types to and from Variants. In general, arrays/scalars of any VB basic type, as well as arrays/scalars of Variant types, can be passed as arguments. The tool 14 components also provides direct support for the Excel Range object, used by VBA to represent a range of cells in an Excel worksheet. Additional details on Visual Basic data types and Excel range manipulation can be found in Visual Basic for Applications documentation.

FIG. 7 shows a format of a default VB function wrapper 209 generated for each class method. By default, the generated formula function contains an argument list with all the inputs to the method call and a return value corresponding to the first output parameter. The argument list includes each explicit input parameter. If the optional varargin parameter is present in the original M-function, additional arguments varargin1, varargin2, ..., vararginN are generated, where N is a number chosen by the tool 14. This function generally includes a declaration for each output parameter as type Variant. If the original M-function contains a varargin, a variable is declared of type Variant to pass collectively the varargin1, ..., vararginN parameters in the form of a Variant array. The main function body contains code for: packing varargin parameters if available, creating the necessary class instance, calling the target method and error handling.

The build process 22 provides for robust data conversion and array formatting to preserve the flexibility of MATLAB functions when calling from VISUAL BASIC environment. Also provided is custom error processing so that errors originating from MATLAB functions are automatically manifested as VISUAL BASIC exceptions. The information returned with the error references the original MATLAB code, making the debugging task easier.

The components are dual interfaced COM objects that support COM Automation compatible data types. When a method is invoked on a component, the input parameters are converted to MATLAB internal array format and passed to the compiled M-function. When the function exits, the output parameters are converted from MATLAB internal array format to COM Automation types.

The COM client passes all input and output arguments in the compiled M-functions as type VARIANT. The COM VARIANT is a union of several simple data types. A type VARIANT variable can store a variable of any of the simple types, as well as arrays of any of these values. The Win32 API provides many functions for creating and manipulating VARIANTS in C/C++, and VISUAL BASIC environment provides native language support for this type. Details of the definitions and API support for COM VARIANTS can be found in the VBA documentation. VARIANT variables are self-describing and store their type code as an internal field of the structure. The VARIANT type codes supported by the COM components and data conversion rules for converting between COM VARIANTS and MATLAB arrays are provided in the Appendix.

Figure 8:
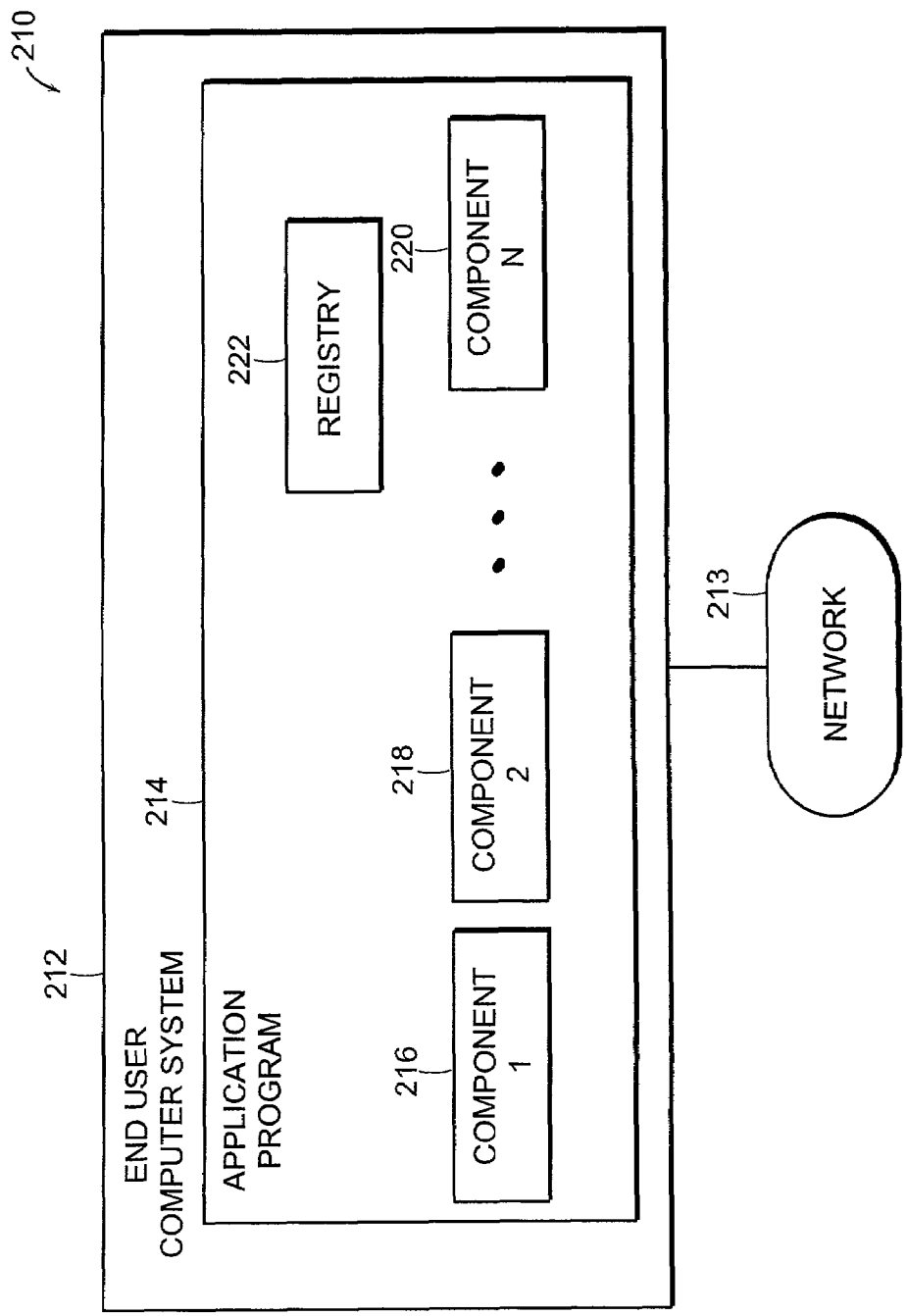
FIG. 8 is a block diagram of an end-user system environment in which a COM component generated by the tool of FIG. 1 is deployed for use.

FIG. 8 is a block diagram of an operating environment 210 in which a COM component is deployed for use by an end user of an end user computer system 212, which may be a standalone computer or connected to a network 213 (as shown). The end user's computer system 212 executes an application program 214, which is a COM-compliant application program. The Application program 214 includes one or more components, labeled 216, 218, and 220. At least one of the components, say, component 218, is a COM component produced by the tool 14. Thus, each component provides the application program with some desired functionality once the component is communicatively coupled to the application program 214. The end user initiates execution of application program 214 by computer system 212 to perform the functions provided by the application program and the linked components 216, 218 and 220.

Application program 214 also includes a registry 222. The registry 222 stores information regarding the application program and components that have been "plugged in" for use with the application program. For COM component 218, the registry 222 stores at least the global unique identifiers (GUIDs) of that component. The component 218 is installed on the system 212 along with any additional software required by the component, e.g., any MATLAB libraries linked at processing stage 166 (of FIG. 5), such as C/C++ Math and Graphics libraries. A utility (not shown) registers the component DLL 218 and the other software DLLs. Also, during installation, any add-ins, e.g., Excel add-ins (*.xla) as in the examples described above, are written to current directory locations. When the component DLL 218 is removed from the system 212, it must be "unregistered" by the utility to ensure that the registry 222 does not retain erroneous information.

Figure 9:
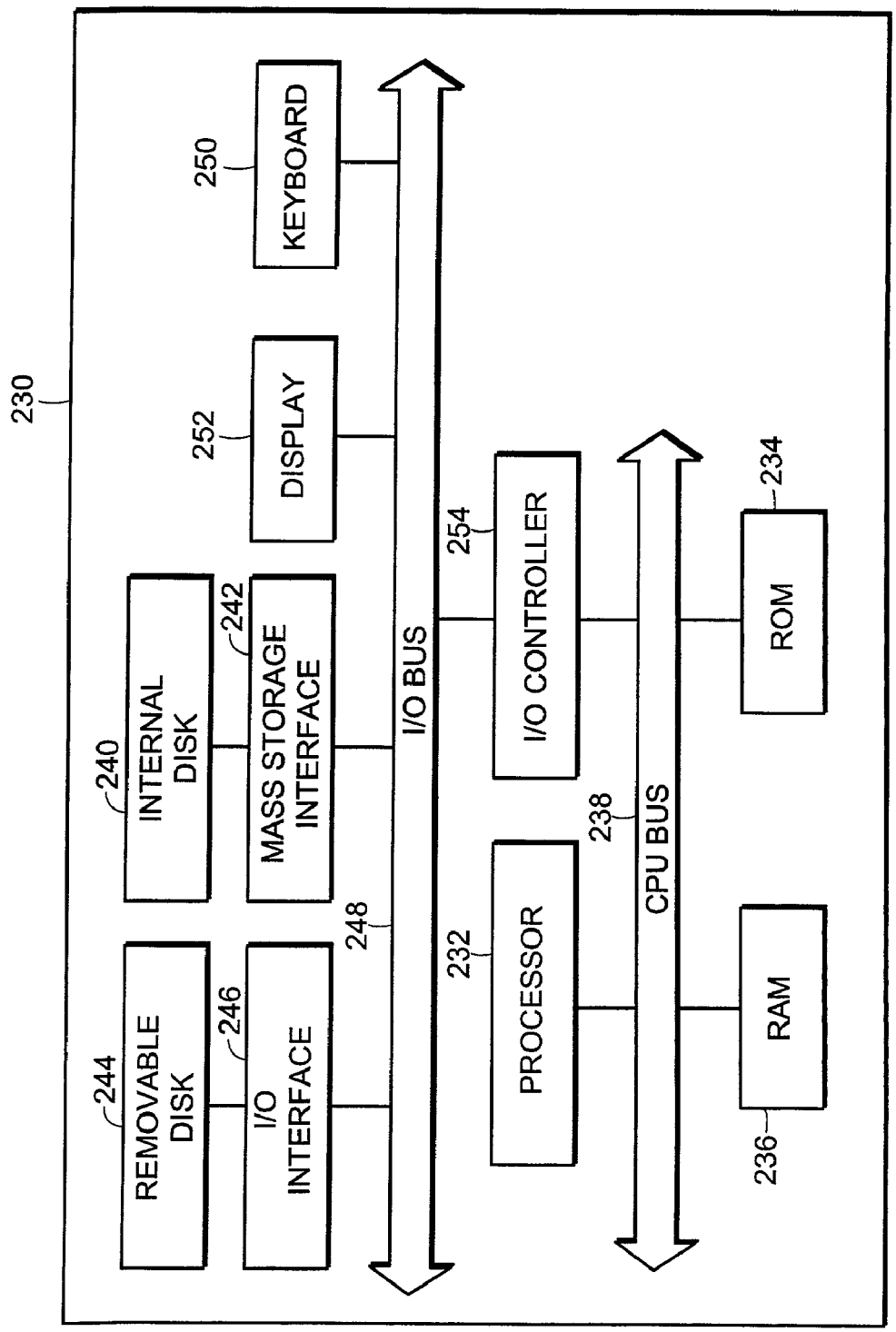
FIG. 9 is a diagram illustrating a sample computer system suitable to be programmed with embodiments of the builder tool for use as the development system of FIG. 1.

Referring to FIG. 9, an exemplary computer system 230 suitable for use as system 10 (as well as system 212) and, therefore, for supporting the tool 14 and any other processes used or invoked by tool 14, is shown. The tool 14 may be implemented in a computer program product tangibly embodied in a machine-readable storage device for execution by a computer processor 232; and methods of the tool may be performed by the computer processor 232 executing a program to perform functions of the tool by operating on input data and generating output.

Suitable processors include, by way of example, both general and special purpose microprocessors. Generally, the processor 232 will receive instructions and data from a read-only memory (ROM) 234 and/or a random access memory (RAM) 236 through a CPU bus 238. A computer can generally also receive programs and data from a storage medium such as an internal disk 240 operating through a mass storage interface 242 or a removable disk 244 operating through an I/O interface 246. The flow of data over an I/O bus 248 to and from I/O devices 240, 244, 250, 252 and the processor 232 and memory 236, 234 is controlled by an I/O controller 254. User input is obtained through a keyboard 250, mouse, stylus, microphone, trackball, touch-sensitive screen, or other input device. These elements will be found in a conventional desktop computer as well as other computers suitable for executing computer programs implementing the methods described here, which may be used in conjunction with any display device 252, or other raster output device capable of producing color or gray scale pixels on paper, film, display screen, or other output medium.

Storage devices suitable for tangibly embodying computer program instructions include all forms of non-volatile memory, including by way of example semiconductor memory devices, such as EPROM, EEPROM, and flash memory devices; magnetic disks such as internal hard disks 240 and removable disks 244; magneto-optical disks; and CD-ROM disks. Any of the foregoing may be supplemented by, or incorporated in, specially-designed ASICs (application-specific integrated circuits).

Typically, the tool 14 and other related processes reside on the internal disk 244. These processes are executed by the processor 232 in response to a user request to the computer system's operating system (not shown) after being loaded into memory. The files produced by these processes may be retrieved from a mass storage device such as the internal disk 240 or other local memory, such as RAM 236 or ROM 234.

The system 10 illustrates a system configuration in which the software 12 is installed on a single stand-alone or networked computer system for local user access. In an alternative configuration, e.g., the software or portions of the software be installed on a file server to which the system 10 is connected by a network, and the user of the system accesses the software over the network.

In other embodiments, the programming language and technology of the software 12 may be one or more of C++, JAVA programming language, VISUAL BASIC programming language, COM, COM+, Distributed COM (DCOM), NET and the like. One skilled in the art will appreciate that other programming technologies and languages may also be used.

It is to be understood that while the invention has been described in conjunction with the detailed description thereof, the foregoing description is intended to illustrate and not limit the scope of the invention, which is defined by the scope of the appended claims. Other embodiments are within the scope of the following claims.

What is claimed is:

1. An automated method of generating a software component for use by an application program comprising:
receiving source code for one or more functions created in a first programming environment, wherein the one or more functions are capable of being executed in a MATLAB programming environment;
processing the source code to automatically convert the source code from a first programming language to a second progamming language to create a component including object code for the one or more functions, wherein the first programming language is suitable to use in the first programming environment;
generating automatically COM source code files for the component in the second programming language; and
wherein the component is usable by the application program in a second programming environment to access the one or more functions of the component.

2. The method of claim 1, further comprising:
generating an interface compatible with a second programming environment for use by the application program in accessing the one or more functions in the component in the second programming environment.

3. The method of claim 2, wherein the interface comprises a wrapper file that enables run time function calls of the application program in the second programming environment to be routed to the functions in the component.

4. The method of claim 3, wherein the wrapper file maps syntax of the run time function calls in the first programming environment to function calls in the second programming environment.

5. The method of claim 4, wherein the second programming environment is Visual Basic and the interface is usable as a scripting language by a software program.

6. The method of claim 1, wherein the component comprises a Component Object Model (COM) object.

7. The method of claim 6, wherein the component is implemented as a dynamic linked library (DLL) file.

8. The method of claim 6, wherein the component is implemented as an executable file.

9. The method of claim 1, wherein the first programming environment is a MATLAB programming environment.

10. The method of claim 1, wherein the second programming environment is a VISUAL BASIC programming environment.

11. The method of claim 1, wherein the first programming language is MATLAB.

12. The method of claim 1, wherein the second programming language is C++.

13. The method of claim 1, wherein the COM source code files include an Interface Description Language (IDL) source code file, class definition and implementation files, a DLL exports files and a source file providing an implementation of each exported function of the component.

14. The method of claim 13, wherein processing invokes an IDL compiler to process the IDL source code file to produce an interface header file and an interface GUID file.

15. The method of claim 14, wherein processing further comprises compiling the converted source code files, generated COM source code files and processed IDL files to produce object files.

16. The method of claim 15, wherein compiling compiles a file that includes template implementations of all required COM base classes and registration code.

17. The method of claim 16, wherein processing further comprises linking one or more libraries required to support the one or more functions to the object files to produce a version of the component that does not include type information.

18. The method of claim 17, wherein the generated COM source code files further include a resource script file, and wherein the IDL compiler further produces a component type library file and wherein processing further comprises invoking a resource compiler on the version of the component that does not include type infonnation, the resource script file and the component type library file to produce the component.

19. The method of claim 1, further comprising providing a user interface to receive as an input a user selection selecting the one or more functions.

20. The method of claim 19, wherein the user interface receives as additional input a name of a class to be used in run-time function calls to the functions in the component.

21. The method of claim 19, wherein the user interface includes a user interface device that, when activated, causes the processing to occur.

22. A computer program product residing on a computer-readable medium that automatically generates a software component for use by an application program, the computer program product comprising instructions causing a computer to:

receive source code for one or more functions created in a first programming environment, wherein the one or more functions are capable of being executed in a MATLAB programming environment;

process the source code to automatically convert the source code from a first programming language to a second programming language to create a component including object code for the one or more functions, wherein the first programming language is suitable to use in the first programming environment;

generate automatically COM source code files for the component in the second progammning language; and generate an interface in a second programming environment for use by the application program in accessing the one or more functions in the component.

23. An apparatus comprising:

a build process stored in a memory;

a user interface stored in a memory, the user interface being configured to receive from a user a selection of one or more functions created in a first programming environment and a COM component name specified by the user, wherein the one or more functions are capable of being executed in a MATLAB programming environment; and the user interface comprising a user interface device that, when selected by the user, causes execution of the build process, which operates on the selection of one or more functions to automatically convert source code for the one or more functions from a first programming language to a second programming language to build a COM component of the specified COM component name that provides a binary interface through which a COM-compatible application program can perfonn run-time functions on the selection of one or more functions.

24. The apparatus of claim 23, wherein the one or more functions of the selection comprise MATLAB functions.

* * * * *

UNITED STATES PATENT AND TRADEMARK OFFICE
CERTIFICATE OF CORRECTION

PATENT NO. : 7,353,502 B2  Page 1 of 1
APPLICATION NO. : 10/190288
DATED : April 1, 2008
INVENTOR(S) : Stewart et al.

It is certified that error appears in the above-identified patent and that said Letters Patent is hereby corrected as shown below:

In the specification, in the background section, at column 1, line 23, in the printed patent, please change "language" to -- language; --

In the specification, in the summary section, at column 1, line 58, in the printed patent, please change "component" to -- component, --

In the specification, in the summary section, at column 1, line 59, in the printed patent, please change "functionsThe" to -- functions, The --

In the specification, in the detailed description section, at column 3, line 20, in the printed patent, please change ""M-functions","" to -- "M-functions"; --

In the specification, in the detailed description section, at column 3, line 49, in the printed patent, please change "tool 14," to -- tool 14; --

Signed and Sealed this

First Day of July, 2008

JON W. DUDAS
*Director of the United States Patent and Trademark Office*